United States Patent [19]

Shoults et al.

[11] 4,016,199
[45] Apr. 5, 1977

[54] COMPOUNDS CONTAINING NITROGEN AND FLUORINE

[75] Inventors: Royland D. Shoults, Arab; Robert S. Yost, Huntsville, both of Ala.

[73] Assignee: Rohm and Haas Company, Philadelphia, Pa.

[22] Filed: Apr. 2, 1963

[21] Appl. No.: 270,110

[52] U.S. Cl. .............................. 260/486 H; 149/119
[51] Int. Cl.$^2$ ................... C07C 69/54; C07C 93/33
[58] Field of Search ................................. 260/486 H

[56] References Cited
UNITED STATES PATENTS

| 3,436,382 | 4/1969 | Reed | 260/486 X |
|---|---|---|---|
| 3,441,549 | 4/1969 | Gardiner | 149/44 X |

Primary Examiner—Leland A. Sebastian

EXEMPLARY CLAIM

1. Processes for the preparation of esters of acrylic and alkacrylic acids with carbinols containing difluoramino groups which comprise reacting the acid chlorides of said acids with the carbinols containing difluoramino groups in the presence of a Lewis acid catalyst at low temperatures and under reduced pressure.

7 Claims, No Drawings

COMPOUNDS CONTAINING NITROGEN AND FLUORINE

This invention concerns processes for the preparation of polymerizable monomers, which monomers are high energy compounds which can be polymerized to polymers and copolymers with good physical properties. More particularly, it concerned processes for the preparation of esters of acrylic and alkacrylic acids with carbinols containing difluoramino groups.

It is known to prepare bis (difluoramino) acrylates and alkacrylates by the reaction of $NF_2$-containing alcohols with acrylic and alkacrylic anhydrides. However, the anhydrides are expensive. using the anhydride process, yields are lower, the product is impure and different to purify. One mole of acid is produced per mole of anhydride used, and this poses a serious purification problem.

It has been found that acryloyl and alkacryloyl chlorides can be substituted for the anhydrides of the prior art, and that with a suitable catalyst, the reaction can be conducted at low temperatures and at reduced pressure, which conditions aid the elimination of HCl so that an acid scavenger is not required. If the same reactants are reacted at an elevated temperature, HCl addition products are formed and it is difficult or impossible to separate these addition products from the $NF_2$-containing acrylates or alkacrylates.

Typical acid chlorides are acryloyl chloride, methacryloyl chloride and ethacryloyl chloride. The higher alkyl acryloyl chlorides are also operable, but for use as oxidizable binders in propellant compositions they are not preferred since the ratio of $NF_2$ groups to carbon and hydrogen atems are too low.

Typical of the carbinols employed in these reactions are carbinols of the formula

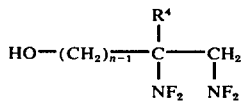

in which n is an integer from 1 to 5, and $R^4$ is hydrogen or methyl. They are prepared by reacting alkenyl esters with $N_2F_4$. Thus, allyl trifluoroacetate is reacted with tetrafluorohydrazine, $N_2F_4$, to give the adduct which is then transesterified with methanol to give 2,3-bis(difluoramino) propanol-1. In a similar manner, vinyl trifluoroacetate by the same series of reactions, gives 1,2-bis (difluoramino) ethanol.

Typical of the carbinols of this type are:
1,2-bis(difluoramino) ethanol,
2,3-bis(difluoramino) -2-methyl-propanol-1,
2,3-bis(difluoramino)butanol-1,
3,4-bis(difluoramino)butanol,
1,2-bis(difluoramino)pentanol-3, and
5,6-bis(difluoramino)hexanol-2.

The carbinol of the formula

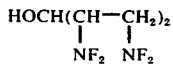

is prepared by the addition of $N_2F_4$ to double bonds followed by further reaction. Thus, divinyl carbinol is esterified by reacting with trifluoroacetic anhydride, the resulting ester is reacted with two moles $N_2F_4$ and the adduct is transesterified with methanol to produce bis(1,2-difluoraminoethyl) carbinol, which can also be named 1,2,4,5-tetrakis(difluoramino) pentanol-3.

The carbinols of the formula

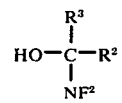

are prepared by reacting compounds of the formula

with difluoramine, $HNF_2$. $R^2$ and $R^3$ are hydrogen or lower alkyl containing 1 to 4 carbon atoms.

Typical of these alcohols are: α-difluoraminomethanol, α-difluoraminoethanol, and α-difluoraminobutanol.

The compounds of the present invention can be represented by the following formula

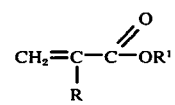

in which R is selected from the group consisting of hydrogen, methyl and ethyl, and $R^1$ is selected from the group consisting of

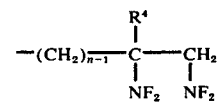

in which n is an integer from 1 to 5, and $R^4$ is selected from the group consisting of hydrogen and methyl,

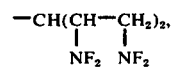

and

in which $R^2$ is selected from the group consisting of hydrogen and lower alkyl containing 1 to 4 carbon atoms, and $R^3$ is selected from the group consisting of hydrogen and lower alkyl containing 1 to 4 carbon atoms.

The monomers of the present invention provide means for introducing difluoramino groups into polymers. By copolymerizing with other ethylenically unsaturated polymerizable monomers, the nitrogen and fluorine contents of the copolymers can be readily controlled. The polymers and copolymers of the present invention are useful as oil-resistant coatings.

It is well-known in the prior art to employ basic compounds as HCl scavengers when reacting acid chlorides with alcohols, and it is set forth in U.S. Pat. No. 2,117,349 that calcium carbonate will function effectively. It is also common to use amines, particularly tertiary amines, as HCl scavengers and this is clearly shown in the prior art. However, it has been found that $NF_2$-containing compounds undergo loss of hydrogen fluoride under basic conditions, and this practically precludes the use of basic acid scavengers in the preparation of $NF_2$-containing acrylates and alkacrylates. Thus, for instance, 2,3-bis(difluoramino)propyl acrylate, even in the presence of such a weak base as sodium acetate, will lose three moles of hydrogen fluoride to form 2-cyano-2-fluoriminoethyl acrylate.

The process as set forth in U.S. Pat. No. 2,117,349 employing calcium carbonate as an HCl acceptor was carried out using acryloyl chloride and 2,3-bis(difluoramino) propanol, but shortly after the reagents were mixed, an exotherm occurred and the reaction mass ignited and burned violently with the evolution of the gas. This ignition occurred despite the application of a cooling bath.

The use of a specific catalyst makes it possible to conduct the reaction at relatively low temperatures, thus avoiding the formation of HCl addition products as previously described. The catalysts also make it possible to conduct the reaction under reduced pressure which aids in the elimination of HCl. These catalysts are Lewis acids, but they vary in their effectiveness and some, notably anhydrous aluminum chloride and boron trifluoride, are not preferred because they attack the $NF_2$ groups. Particularly preferred are zinc chloride and sulfuric acid, with zinc chloride being particularly preferred. The amount of catalyst above a critical minimum is not too important but there appears to be no advantage in using excessive amounts. 0.05% to 10% on the weight of $N_2F_4$ adduct of an alkyl ester is employed, with 1% to 5% representing the preferred amounts, particularly when the catalyst is zinc chloride.

As pointed out hereinbefore, the reaction temperature is very important because, at elevated temperatures, there is addition of HCl to the desired product and the addition product so formed is very difficult to separate from the desired product which remains. The reaction temperature of from 0°C to 100° C is employed with the range 20° C to 50° C preferred.

It is preferred to operate under reduced pressure since this effects much more rapid removal of the HCl which is formed, thus further reducing the possibility of HCl addition to the desired product. The reaction is generally conducted under 100 mm to 200 mm pressure.

During the reaction of the acyl chlorides, there is formed an appreciable amount of the corresponding anhydride, and the most convenient and efficient means of removal is by in situ treatment with methanol which converts the anhydride to the corresponding methyl ester and the acid. The acid is eliminated by distillation of the product from sodium bicarbonate and the methyl ester is separated by fractionation. If the by-product anhydride is not removed, it contaminates the desired product and is difficult to separate from it.

Because the products of the present invention are polymerizable monomers, it is preferred to conduct the reaction in the presence of a polymerization inhibitor. Such polymerization inhibitors are numerous and well-known and are widely used with the acrylates and methacrylates of commerce. A particularly suitable inhibitor for the processes of th present invention is 2,3-dicyanobenzoquinone. Oxygen can also be employed as an inhibitor. 2,3-dicyanobenzoquinone is used to the extent of about 0.05% to 2% based on the weight of the finished product. In the final recovery, this product does not distill with the monomer and it is necessary to reinhibit the purified monomer. Again, polymerization inhibitors for acrylates and methacrylates are well-known and the preferred inhibitor for storage with the compounds of the present invention is 2,3-dicyanobenzoquinone. It is used to the extent of 0.01% to 0.05%.

In the preparation of $NF_2$- containing carbinols, an unsaturated ester of trifluoroacetic acid or formic acid is reacted with $N_2F_4$ and subsequently hydrolyzed with methanol to give the free carbinol. The hydroxyl of the unsaturated carbinol is protected by the esterification of trifluoroacetic acid or formic acid since the $NF_2$-containing esters are more stable than the corresponding alcohols. One modification of the present process involves the in situ treatment of the formate or trifluoroacetate esters of the alcohols with methanol to free the $NF_2$ carbinol, removal of the methyl esters of the acids, as well as any excess methanol, and subsequent treatment with the acyl halide. The esters of $NF_2$-containing carbinols used in the process of the present invention are appreciably more stable than the free alcohols, and the procedure set forth hereinbefore does not necessitate handling the free alcohols. This is particularly pertinent on scale-up and to a lesser extent to operation of the reaction by remote control.

Typical of the acrylic and methacrylic esters which have been prepared by the process of the present invention are:

2,3-bis(difluoramino) propyl acrylate
2,3-bis(difluoramino) propyl methacrylate
1,2-bis(difluoramino) ethyl acrylate
1,2-bis(difluoramino) ethyl methacrylate
2-methyl-2,3-bis(difluoramino) propyl acrylate
2-methyl-2,3-bis(difluoramino) propyl methacrylate
1-methyl-1,2-bis(difluoramino) ethyl acrylate
1-methyl-1,2-bis(difluoramino) ethyl methacrylate, and
3,4-bis(difluoramino) butyl acrylate.

EXAMPLE I

Preparation of 2,3-bis(difluoramino) propyl Acrylate (NFPA) Apparatus and Reagents The apparatus consisted of a 500-ml. 4-neck flask (3 T 24/40and 1 T 10/30joints), "Lew" magnetic stirrer, thermometers (bath, pot, and head), dropping funnel, combination reflux condenser, distilling column (water-jacketed Vigreaux, 40 cm.), fraction cutting distilling receiver, and inlet tube for the admission of reagents. The flask was heated and cooled by a water bath and Dry Ice- acetone was use in the trap.
Reagents Consisted of:
 1. 258 g. (1 mole) of 2,3-bis(difluoramino) propyl trifluoroacetate (ATFA adduct).
 2. 129.3 g. (4 moles) of absolute methanol containing 2.6 g of dissolved $ZnCl_2$.
 3. 181 g. (2 moles) of acryloyl chloride containing 0.02% of hydroquinone.
 4. Slurry of 12.6 g. (0.15 moles) of $NaHCO_3$ in 32 g. (1 mole) of absolute methanol.

5. 2 g. of 2,3-dicyanobenzoquinone.

Procedure

The dropping funnel was charged with the acryloyl chloride solution and the methanol solution was added to the flask. [If the ATFA-adduct was desensitized with methylene chloride, the adduct solution was added to the flask prior to the methanol addition. The methylene chloride was distilled off, the pressure gradually lowered to 10 mm., and the head temperature allowed to reach 50° C. (the boiling point of the adduct is 48°–49° C. at 7 mm.)]. with stirring, the ATFA-adduct was added to the flask in small portions (25–30 g.) via the inlet tube. The flask was gradually heated to 60°–65° C. at which point methyl trifluoroacetate began to distill (B.P. 39°–40° C.). Heating was discontinued for a short period when the vapor temperature went to 45° C. (methanol was distilling). When the pot temperature reached 70° C. essentially all of the methyl trifluoroacetate was distilled and the pressure was gradually lowered to 3 mm. The pot temperature was allowed to cool somewhat and was then maintained at 50°–55° C. When the head temperature reached 40° C. (B.P. of NF-propanol, 40°–41° C. 1.5 mm.) the distillation was stopped, the pressure brought to atmospheric, and the flask cooled to 30° C.

The pressure was lowered to 100 mm. by means of a water aspirator, and the acryloyl chloride was added slowly (exotherm) via the funnel. With cooling, the acryloyl chloride was added over a 45-minute period and the temperature was maintained at 30°–40° C. When the addition of the acryloyl chloride was complete the temperature of the flask was raised to 50° C. and the pressure gradually lowered to 1 mm. to distill the excess acryloyl chloride and any unreacted alcohol. When the head temperature reached 50° C. (B.P. of the acrylate is 53°–54° C. at 1 mm.) a small amount (4–6 g.) of distillate (impure NFPA) was collected. At this point the distillation was stopped, the pressure brought to atmospheric, and the methanol-NaHCO₃ slurry was added to the flask. The methanol was stripped at reduced pressure to maintain the pot temperature at 50°–55° C. (total residence time, 30 min.) and when essentially all the methanol was distilled the pressure was gradually lowered to 1 mm. (pot temperature 55° C.). The pressure was then brought to atmospheric; no distillate was collected.

2,3-Dicyanobenzoquinone (2g.) dissolved in 15 ml. of methylene chloride was added to the flask and the pressure was gradually lowered to 0.75 mm. to distill the product.

| Fraction | B.P.° C. (0.75 mm.) | Wt. (g.) | Index of Refraction $n_D^{20}$ |
|---|---|---|---|
| Forerun | 45–52 | 13.0 | 1.4065 |
| 1 | 52–53 | 21.3 | 1.4062 |
| 2 | 53–54 | 35.3 | 1.4062 |
| 3 | 53–54 | 29.3 | 1.4060 |
| 4 | 53–54 | 36.1 | 1.4060 |
| 5 | 53–54 | 38.4 | 1.4060 |

-continued

| Fraction | B.P.° C. (0.75 mm.) | Wt. (g.) | Index of Refraction $n_D^{20}$ |
|---|---|---|---|

Total Yield: 172.4 g., 80%.

Fractions 1–5 were combined and 0.01% 2,3-dicyanobenzoquinone was added to inhibit the NFPA against polymerization upon storage.

| Anal. | %C | %H | %N | %Cl |
|---|---|---|---|---|
| Calc'd. for $C_6H_8O_2N_2F_4$ | 33.34 | 3.73 | 12.96 | 0.00 |
| Found | 33.50 | 3.72 | 13.65 | 0.13 |
| Purity by VPC: 97.4%. | | | | |

EXAMPLE II

2,3-bis(Difluoramino) propyl methacrylate 2,3-bis(Difluoramino) propyl methacrylate was prepared in 70% yield by substituting methacryloyl chloride for acryloyl chloride in the procedure give for Example I.

Physical Properties of Product
B.P. 46–47° C. (0.3 mm.), $n_D^{20} = 1.4123$, $d_4^{25} = 1.2660$.

| Anal. | %C | %H | %N | %F | %Cl |
|---|---|---|---|---|---|
| Calc'd. for $C_7H_{10}O_2N_2F_4$ | 36.53 | 4.38 | 12.17 | 33.02 | 0.00 |
| Found | 37.28 | 4.37 | 12.63 | 32.83 | 0.09 |
| Purity by VPC: 99.6%. | | | | | |

Example III

1,2-bis(Difluoramino) ethyl Acrylate

Procedure

To a 50-ml. 3-neck flask equipped with a thermometer, dropping funnel, a 3-inch unpacked column, partial take-off head, and magnetic stirrer was added 12.8 g. (0.4 moles) of absolute methanol. The methanol was heated (oil bath) to 55° C. and with stirring 24.4 g. (0.1 mole) of vinyl trifluoroacetate-$N_2F_4$ adduct (VTFA adduct) was added dropwise (exothermic) via the funnel over a 20-minute period. Methyl trifluoroacetate (MTFA) began to distill at 39°–40° C. at a moderate rate as the adduct was added. The flask was slowly heated until the temperature of the flask reached 70° C. (75–80% of the theroretical MTFA was collected) and the pressure was slowly reduced to 25 mm. to distill the excess methanol and remaining MTFA. When the vapor temperature reached 39°–40° C. (b.p. of the NFE-alcohol) the distillation was stopped and the pressure was brought to atmospheric).

When the temperature of the flask had dropped to 25° C., 0.74 g. of 96.0% sulfuric acid was added and the pressure was lowered to 100 mm. At this point 18.1 g. (0.2 moles) of acryloyl chloride (containing 0.4 g. of 2,3-dicyanobenzoquinone) was added slowly via the dropping funnel. The temperature was maintained at 25°-30° C. for 1½ hours when the reaction had essentially gone to completion. The pressure was lowered to 5 mm. while the pot temperature was raised to 40° C. to distill the excess acryloyl chloride.

The residue was dissolbed in 50 cc. of methylene chloride and washed with cold water and aqueous sodium bicarbonate. The methylene chloride was stripped with a rotary evaporator, 2,3-dicyanobenzoquinone (0.3 g.) was added, the flask was transferred to a Holtzman column, and the residue was distilled.

| Fraction | B.P.° C. | Wt. (grams) | Index of Refraction ($n_D^{20}$) |
|---|---|---|---|
| Forerun | 40–44 (6.5 mm) | 0.5 | 1.3873 |
| 1 | 44–45 (6.5 mm) | 1.5 | 1.3867 |
| 2 | 44–45 (6.5 mm) | 8.0 | 1.3865 |

Yield — 50% based on starting adduct. Fraction No. 2 — Purity, 98.6% V.P.C.; $d_4^{21.5} = 1.3377$.

Anal. (fraction 2) % Calc'd. for $C_5H_6O_2N_2F_4$; C, 29.71; H, 2.99; N, 13.86; F, 37.60; Cl, 0.00; Found: C, 29.29; H, 2.93; N, 14.80; F, 37.84; Cl, 0.10.

We Claim

1. Processes for the preparation of esters of acrylic and alkacrylic acids with carbinols containing difluoramino groups which comprise reacting the acid chlorides of said acids with the carbinols containing difluoramino groups in the presence of a Lewis acid catalyst at low temperatures and under reduced pressure.

2. Processes as set forth in claim 1 in which the Lewis acid is selected from the group consisting of zinc chloride and $H_2SO_4$.

3. Processes as set forth in claim 1 in which the reaction temperature is in the range from 0° to 100° C.

4. Processes as set forth in claim 1 in which the acid chloride is selected from the group consisting of acryloyl chloride and methacryloyl chloride.

5. Processes as set forth in claim 1 in which the carbinol containing difluoramino groups is selected from the group consisting of carbinols of the formula

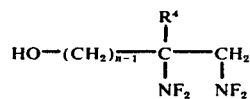

in which $n$ is an integer from 1 to 5, and $R^4$ is selected from the group consisting of hydrogen and methyl, the carbinol of the formula

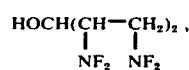

and carbinols of the formula

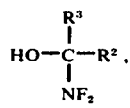

in which $R^2$ and $R^3$ are selected from the group consisting of hydrogen, and lower alkyl containing 1 to 4 carbon atoms.

6. Processes as set forth in claim 1 in which a polymerization inhibitor is employed.

7. Processes as set forth in claim 6 in which the inhibitor is 2,3-dicyanobenzoquinone.

* * * * *